Sept. 9, 1969    Y. L. JOHANSSON ET AL    3,465,848
LUBRICATING DEVICES
Filed June 21, 1966

INVENTORS:
YNGVE LENNART JOHANSSON
SVEN ERIK WILLNER ORTE
BY Howson & Howson
ATTYS.

United States Patent Office 3,465,848
Patented Sept. 9, 1969

3,465,848
LUBRICATING DEVICES
Yngve Lennart Johansson and Sven Erik Willner Orte, Goteborg, Sweden, assignors to Aktiebolaget Svenska Kullagerfabriken, Goteborg, Sweden, a corporation of Sweden
Filed June 21, 1966, Ser. No. 559,236
Claims priority, application Sweden, June 28, 1965, 8,478/65
Int. Cl. F16n *11/08, 13/10;* B67d *5/04*
U.S. Cl. 184—27                                6 Claims

ABSTRACT OF THE DISCLOSURE

A lubricating device comprising a housing, an elongated tubular member depending from said housing, a nozzle mounted in the lower terminal end of said tubular member remote from said housing and having a channel therein of predetermined cross-section terminating in a discharge orifice of smaller cross-section, an elongated piston rod having its lower terminal and engageable in said channel and spaced from the inner wall of said tubular member to define a lubricant chamber adapted to be filled with lubricant under pressure, said nozzle having an extension projecting into said tubular member of smaller cross-section to define an annular space between the extension and inner wall of the tubular member, means defining at least one bore providing fluid communication between the channel and lubricant chamber, means in said housing for normally maintaining said piston rod in a first rest position wherein the lower terminal end of the piston rod is disposed below said bore to prevent discharge of lubricant through the discharge orifice and means for raising said piston rod to a second retarded position wherein the lower terminal end is disposed above the bore to permit lubricant to enter said channel and be discharged under great velocity and pressure upon return to the first position.

---

The present invention relates to an improved lubricating device and is particularly intended for grease. A device of this kind may be operated as a pump according to the piston or plunge manner of action. In order to obtain a more efficient and at the same time economical lubrication, for example in lubricating rolling bearings, it is known to force small quantities of lubricant from a nozzle directly onto the inner surfaces of the bearing. Further to obtain the most economical action, i.e. to save lubricant per unit of time, this supplying of lubricant may preferably be intermittent. Hitherto it has been possible to apply small quantities of oil to the inner parts of a rolling bearing to be lubricated in this manner. It is now desired to provide a simple and reliable device by which it may be possible to force small quantities of lubricant, for example grease, to the inner surfaces of a bearing. Certain advantages are associated with the use of grease instead of oil. The sealing arrangement of the bearing housing can be simplified since a solid lubricant has not the same leaking aptitude as oil. The greatest advantage is probably that grease has a greater adhesitivity and is therefore not so easily removed from the bearing surfaces by the influence of the centrifugal force. In other words, a lubricating film with greater carrying capacity is obtained at the bearing surfaces when using grease instead of oil, when it concerns so small quantities as in this case.

The problem of feeding very small quantities of lubricant from a grease reservoir of a lubricator to a lubrication feed pipe is nowadays solved. According to the invention this known lubricator for supplying lubricant is completed with a device so designed, that small quantities of lubricant are forced out from the orifice of the nipple breaking the air streams appearing beside a rapidly rotating rolling bearing. It will thus be possible for the lubricant to reach races, rolling bodies and cages. The device in accordance with the invention is characterized mainly in that a piston is mounted inside a feed pipe filled with lubricant under pressure and that an operative portion of the piston turned from an impulse source is situated close to a nozzle attached to said feed pipe, the orifice of which is of so small cross section in relation to the operating piston area that the quantity of lubricant located in front of the piston is forced out under great velocity and pressure during the piston stroke.

Figure 1:
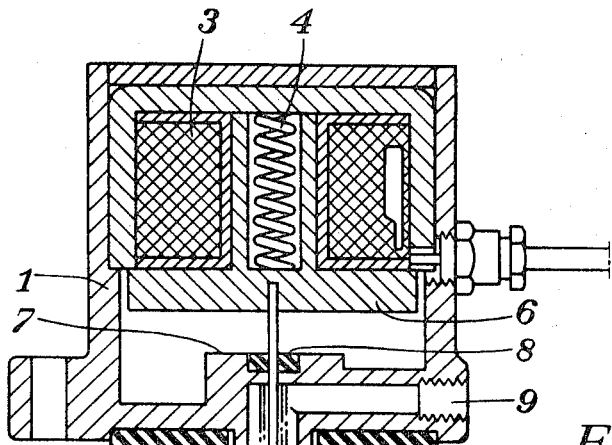
Figure 2:
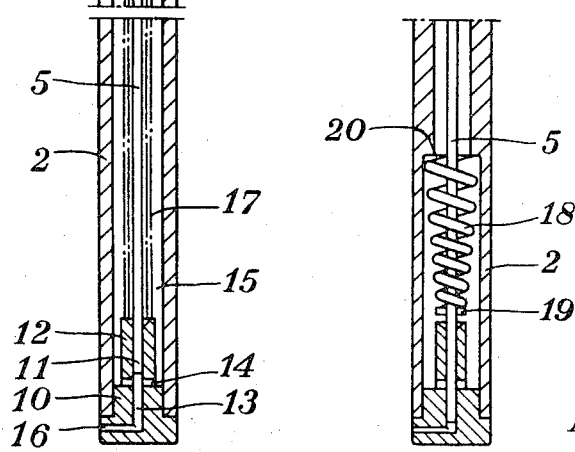

The invention is now described with reference to the attached drawing in which FIGURE 1 shows a longitudinal cross section through a lubricator according to the invention. FIGURE 2 is a partial section of the pipe portion of the lubricator. The lubricator, of a kind known per se, comprises a housing 1 and a feed pipe 2 for lubricant connected thereto. This pipe may, of course, also be removably connected to the housing by means of threading or the like in order to make it possible to change the feed pipes and use different dimensions. An impulse source 3, 4 known per se, is arranged in the housing actuating a piston 5, which makes a pump stroke, whereby a certain quantity of lubricant is forced out at the front portion of the lubricator. The impulse system may consists of a spring urged by an electro-magnet, which on pre-determined occasions is made currentless, whereby a pump stroke is obtained by means of the spring force.

This system may also be used in an inverted embodiment, i.e. the magnet causes the pump stroke. The timing can be regulated by a switch device sensible for heat or by a cam device outside the lubricator. The piston fitted into the housing may of course also be actuated by mechanical means. The piston 5 is at one end connected to a magnetic core 6 supporting the above mentioned impulse source 3, 4. Preferably, a piston is loosely fitted to said core in order to make it possible to remove it. In the present embodiment the piston is made as a bar with uniform thickness but can also be made as a compound unit comprising a piston rod connected to a piston of different diameter than the rod. It is also possible to use a piston device of the first mentioned kind having different diameters for bar and piston. Thus it is possible to have a piston rod of very small diameter connected to a piston of a substantially greater diameter. In the wall of the housing 1 adjacent to the feed pipe 2 there is a stop 7, by means of which the stroke of the core 6 is limited. In the centre of the stop where the piston is inserted into the feed pipe, a seal is arranged to prevent lubricant to be pressed into the housing. When a piston rod of small dimension is used this seal is not necessary, and the rod may be guided in a smooth bore in the stop. A supply pipe (not shown here) may be connected to the housing at 9, and this pipe communicates in its turn with a lubricant reservoir. This reservoir is designed in such a manner that lubricant is supplied to the feed pipe under pressure. The reservoir may be fitted directly to the lubricator by a short pipe or be situated at some distance from the lubricator and connected to the lubricator by means of, for instance, a flexible plastic hose. It is also possible to build in the reservoir into the lubricator. The piston has an operative portion guided in a nozzle 10, and the pump stroke will be effected in an extension 12 of the nozzle, said extension thereby serving as a pump cylinder. In FIGURE 1 the piston is shown in retarded position, i.e. the magnetic force overcomes the spring force and the spring 4 is urged. The intermittent working cycle of the system according to the invention regulates the impulse source in such a manner that the resting position of the piston covers a considerably longer part of the cycle than when the piston is in retarded position. This implies certain advantages as the piston serves as a valve during a relatively long resting position, i.e. no leakage of lubricant may be possible through the nozzle during this period which is advantageous if a weak grease or oil is used as lubricant. The time during which the piston is in retarded position as shown in FIGURE 1 is sufficient to introduce lubricant to the channel 13 through the bore 14. Possible air bubbles in the lubricant column 15 can escape through the nozzle during this time. This is very important so that the intermittent cycle of the system is not disturbed owing to air in the system. The nozzle 10 can be removably joined with or fixed to the feed pipe 2 depending upon the fact if it is desirable to vary the ratio between the area of the nozzle and the piston area in an existent lubricator. Thus, it will be possible to have a number of nozzles of various diameter of the outlet bore for the same lubricator. During the pump stroke lubricant is forced out through an orifice 16 under great pressure and in order to reach this effect the area of the orifice is chosen rather small in relation to the area of the piston or the operative portion of the piston. An example of a suitable ratio is that the bore of the nozzle has a diameter of 0.5 mm. and the piston 2 mm., but these values may, of course, be varied in order to obtain the best forced-out-effect. To obtain the above mentioned valve effect of the piston, the end of this is during the resting position situated close to the orifice of the bore of the nozzle, and a further advantage of this location of the pump cylinder is that resiliency in the wall of the pipe and the grease column is eliminated. In the embodiment shown the bore 16 of the nozzle subtends an angle of 90° with the lubricant channel 13. Other directions of the bore of the nozzle may, of course, be chosen, for example, said bore may extend in line with the lubricant channel 13. The conditions under which the lubricator is working may determine the direction of the bore of the nozzle. Under certain conditions and dependent upon what kind of grease is used, it can be convenient to arrange a tube 17 (shown in dot-and-dash lines) around the piston 5, thus making it possible for the piston to contact the grease column only at the lower portion of the feed pipe 2.

FIGURE 2 shows an embodiment in which the spring force necessary for the pump stroke is attained by means of a spring 18 arranged within the feed pipe 2 around the piston 5. In order to facilitate the fitting of the spring it can suitably be of conical shape with the smaller diameter adjacent to the nozzle. This part of the spring is preferably supported against an abutting device 19 attached to the piston bar and the other end of the spring may rest against a shoulder 20 in the feed pipe, or, if the length of the spring is the same as the inner length of the pipe, it may in a suitable manner rest against the wall of the housing. In order to control that the lubricator works under determined conditions when applied to a machine or the like a detchable sensing means, for example a thin bar, may be arranged outside and parallel with the feed pipe, whereby said bar has a turned end, which can be inserted into the bearing in the lubricant direction and thus indicating if the lubricator is forcing out lubricant satisfactory at intervals pre-determined. Concerning suitable lubricants to be used greases of different kinds are perhaps most suitable, but oil of a suitable consistence can also be used.

The lubricator according to the invention is very effective and reliable during operation and since a maintenance-free operation is nowadays required, the present lubricator makes it possible to reduce the need of inspection from once a day to only twice a year.

When lubricating a large rolling bearing by means of the lubricator the refill of lubricant can, as mentioned above, be reduced to twice a year, and it is possible to obtain a satisfactory lubrication at a time interval of, for example, 10 minutes.

The invention may be varied in many ways within the scope of the following claims. Thus, the invention is not limited to be applied to bearing assemblies but can be mounted in connection with any movable machine element, as, for example, in transmissions, pumps, machine tools and other devices in which an efficiently operating lubricator is required.

We claim:
1. A lubricating device comprising a housing, an elongated tubular member depending from said housing, a nozzle mounted in the lower terminal end of said tubular member remote from said housing and having a discharge orifice therein, said discharge orifice comprising first orifice section of predetermined cross section and second orifice section of smaller cross section than said first orifice section, an elongated piston rod having its lower terminal end engageable in said first orifice section and spaced from the inner wall of said tubular member to define a lubricant chamber adapted to be filled with lubricant under pressure, said nozzle having an extension projecting into said tubular member of smaller cross section to define an annular space between the extension and inner wall of the tubular member, means defining at least one bore providing fluid communication between the first orifice section and lubricant chamber, means in said housing for normally maintaining said piston rod in a first rest position wherein the lower terminal end of the piston rod is disposed below said bore to prevent discharge of lubricant through the discharge orifice and means for raising said piston rod to a second retracted position wherein the lower terminal end is disposed above the bore to permit lubricant to enter said first orifice section and be discharged under great velocity and pressure through said second orifice section.

2. A lubricating device as claimed in claim 1 wherein said means normally maintaining said piston rod in a first rest position comprises a biasing spring mounted in said housing.

3. A lubricating device as claimed in claim 1 wherein said lubrication chamber is enlarged at its lower end to define a shoulder and said means biasing said piston rod to said first rest position comprises a biasing spring having one end in engagement with said shoulder and at its opposite end engaging an abutment device on the piston rod adjacent the lower terminal end thereof.

4. A lubricating device as claimed in claim 3 wherein said spring is of conical shape.

5. A lubricating device as claimed in claim 1 wherein said discharge orifice is disposed perpendicularly to said channel.

6. A lubricating device as claimed in claim 1 wherein the means for actuating the piston rod to said second position includes an impulse actuator controlled so that the piston rod in an intermittent working cycle is in said first position a considerably longer part of the cycle than in said second position whereby the lower terminal portion of the piston rod during said first position serves as a valve preventing leakage of lubricant and that the duration of said piston rod in said second position permits escape of any air bubbles.

References Cited

UNITED STATES PATENTS

| 1,704,179 | 3/1929 | De Forest | 184—26 |
| 1,778,936 | 10/1930 | Davis | 184—26 |
| 2,439,888 | 4/1948 | Ginter. | |

FOREIGN PATENTS

| 533,687 | 12/1921 | France. |

HOUSTON S. BELL, Jr., Primary Examiner

U.S. Cl. X.R.

222—385; 184—37